(12) United States Patent
Sasaki et al.

(10) Patent No.: US 6,226,447 B1
(45) Date of Patent: *May 1, 2001

(54) VIDEO SIGNAL RECORDING AND REPRODUCING APPARATUS

(75) Inventors: Seishi Sasaki, Kobe; Yoshikazu Katou, Katano, both of (JP)

(73) Assignee: Matsushita Electric Industrial Co., Ltd., Kadoma (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/701,870

(22) Filed: Aug. 23, 1996

(30) Foreign Application Priority Data

Sep. 11, 1995 (JP) .................................................. 7-232103

(51) Int. Cl.[7] .................................................. H04N 5/917
(52) U.S. Cl. .......................................... 386/112; 386/125
(58) Field of Search .................................. 386/1, 46, 45, 386/108, 109, 111, 112, 125, 126, 95, 96, 83, 92, 4, 52, 55, 64; 360/60, 7; 348/571

(56) References Cited

U.S. PATENT DOCUMENTS

| 4,724,495 | | 2/1988 | Hedberg et al. ........................ 360/22 |
|---|---|---|---|
| 4,777,537 | * | 10/1988 | Ueno et al. ............................ 358/341 |
| 5,047,867 | * | 9/1991 | Strubbe et al. ........................ 358/335 |
| 5,057,932 | * | 10/1991 | Lang ..................................... 358/335 |
| 5,187,589 | * | 2/1993 | Kono et al. ............................ 358/335 |
| 5,237,426 | | 8/1993 | Daito . |
| 5,241,428 | * | 8/1993 | Goldwasser et al. ..................... 360/7 |
| 5,329,320 | | 7/1994 | Yifrach . |
| 5,371,551 | * | 12/1994 | Logan et al. .......................... 348/571 |
| 5,438,423 | | 8/1995 | Lynch et al. . |
| 5,479,302 | * | 12/1995 | Haines ................................... 360/69 |
| 5,481,414 | * | 1/1996 | Takada et al. ......................... 386/112 |
| 5,636,077 | * | 6/1997 | Kim ...................................... 360/69 |
| 5,644,444 | * | 7/1997 | Braithwaite et al. ................... 360/60 |
| 5,657,416 | * | 8/1997 | Boon ..................................... 386/109 |
| 5,892,882 | * | 4/1999 | Kuroda et al. ......................... 386/111 |

FOREIGN PATENT DOCUMENTS

| 2285720 | 7/1995 | (GB) . |
|---|---|---|
| 5101609 | 4/1993 | (JP) . |

OTHER PUBLICATIONS

European Search Report for Application No. 96113735.3–2210; Dated Feb. 25, 1998.

European Search Report related to European Patent Application No. 96113735.3 dated May 6, 1998.

\* cited by examiner

Primary Examiner—Wendy Garber
Assistant Examiner—Christopher Onuaku
(74) Attorney, Agent, or Firm—Renner, Otto, Boisselle & Sklar

(57) ABSTRACT

The video signal recording and reproducing apparatus of the invention includes: a receiving section for receiving a television signal; an image compression section for compressing an amount of information per unit time of the received continuous video signal; a writing section for intermittently writing a compressed video signal, obtained as an output of the image compression section, onto a hard disk apparatus via a magnetic head; a reading section for intermittently reading out the written compressed video signal from the hard disk apparatus via the magnetic head; a decoding section for restoring the read compressed video signal into an original video signal; a display section for displaying the restored video signal; and a control section for controlling the writing section and the reading section such that writing the video signal onto the hard disk apparatus and reading an arbitrary video signal, which was previously written onto the hard disk apparatus, from the hard disk apparatus are performed apparently simultaneously and continuously.

26 Claims, 7 Drawing Sheets

VIDEO SIGNAL RECORDING AND REPRODUCING APPARATUS

BACKGROUND OF THE INVENTION

1. Field of the Invention

The present invention relates to a video signal recording and reproducing apparatus which can simultaneously record and reproduce a video by using a disk apparatus.

2. Description of the Related Art

A video tape recorder (VTR) has heretofore been used as a home-use video recording apparatus. As is well known, a VTR receives a broadcast program transmitted by a broadcasting station via an antenna, records the program and then reproduces the program. That is to say, having once finished the recording operation of a predetermined program, the VTR rewinds the tape on which the program has been recorded and then reproduces the received and recorded program to be watched.

A currently available VTR cannot record and reproduce a video simultaneously. For example, assuming that a broadcast program which starts at 10 o'clock and ends at 12 o'clock is now being received and recorded by a single VTR, it is impossible to reproduce and watch the broadcast program from the beginning from 11 o'clock on, while continuing receiving and recording the program. It is much less impossible to perform a trick play reproducing operation (e.g., a fast-forward reproducing operation or a backward reproducing operation) of a recorded video of a program which is now being received and recorded. On the other hand, a technique which is called "following reproducing operation" is currently utilized for a live broadcast relayed by a broadcasting station. In accordance with this technique, a video which has been transmitted to a broadcasting station is slightly delayed and then delivered substantially in real time. However, in such a case, it is necessary to use either a plurality of VTRs or an optical disk apparatus of a special type in which a recording head and a reproducing head are separately provided, for simultaneously performing the recording and the reproducing operations. If a plurality of VTRs are simultaneously used, then it becomes adversely complicated to operate these apparatuses. On the other hand, the use of such an optical disk apparatus of a special type disadvantageously increases the costs.

SUMMARY OF THE INVENTION

According to the present invention, a video signal recording and reproducing apparatus is provided. The video signal recording and reproducing apparatus of the invention includes: receiving means for receiving a television signal; image compression means for compressing an amount of information per unit time of the received continuous video signal; writing means for intermittently writing a compressed video signal, obtained as an output of the image compression means, onto a hard disk apparatus via a magnetic head; reading means for intermittently reading out the written compressed video signal from the hard disk apparatus via the magnetic head; decoding means for restoring the read compressed video signal into an original video signal; display means for displaying the restored video signal; and control means for controlling the writing means and the reading means such that writing the video signal onto the hard disk apparatus and reading an arbitrary video signal, which was previously written onto the hard disk apparatus, from the hard disk apparatus are performed apparently simultaneously and continuously.

In one embodiment, a compressed video signal which was recorded at an earliest time is sequentially updated by a newly received and obtained compressed video signal.

In another embodiment, an audio signal, as well as a compressed video signal, is recorded onto the hard disk apparatus.

In still another embodiment, the video signal recording and reproducing apparatus further includes instruction means for starting and/or finishing recording a compressed video signal onto the hard disk apparatus.

In still another embodiment, the video signal recording and reproducing apparatus further includes instruction means for starting and/or finishing reproducing a compressed video signal from the hard disk apparatus.

In still another embodiment, the instruction means for starting recording a compressed video signal onto the hard disk apparatus is instantaneously driven manually.

In still another embodiment, the instruction means for starting recording a compressed video signal onto the hard disk apparatus is driven by timer means.

In still another embodiment, the instruction means for finishing recording a compressed video signal onto the hard disk apparatus is driven by timer means.

In still another embodiment, the instruction means for starting reproducing a compressed video signal from the hard disk apparatus is instantaneously driven manually.

In still another embodiment, the display means displays at least a time difference between a time at which a video signal which is being reproduced was recorded and a current time, in addition to a video.

In still another embodiment, the display means displays at least a current time and a time at which a video signal which is being reproduced was recorded, in addition to a video.

In still another embodiment, the video signal recording and reproducing apparatus includes operation means for setting a normal reproduction, a fast forward reproduction, a backward reproduction or a slow reproduction as a reproduction mode.

In still another embodiment, the display means simultaneously displays a received video signal and an output of the decoding means which was previously recorded, reproduced and decoded.

In still another embodiment, the video signal recording and reproducing apparatus further includes television signal detection means for determining whether or not the receiving means has received a normal television signal and writing onto the hard disk apparatus is enabled only when the television signal detection means has detected a normal television signal.

According to another aspect of the present invention, a video signal recording and reproducing apparatus is provided. The video signal recording and reproducing apparatus includes: image compression means for digitizing an input continuous video signal and audio signal, thereby compressing an amount of information per unit time; writing means for intermittently writing a compressed video signal, obtained as an output of the image compression means, onto a hard disk apparatus via a magnetic head; reading means for intermittently reading out the written compressed video signal from the hard disk apparatus via the magnetic head; decoding means for restoring the read compressed video signal into an original video signal; and display means for displaying the restored video signal, thereby reading out predetermined video and audio signals at a predetermined time.

According to still another aspect of the present invention, a video signal recording and reproducing apparatus is provided. The video signal recording and reproducing apparatus includes: image compression means for digitizing an input continuous video signal and audio signal, thereby compressing an amount of information per unit time; writing means for intermittently writing a compressed video signal, obtained as an output of the image compression means, onto a hard disk apparatus via a magnetic head; reading means for intermittently reading out the written compressed video signal from the hard disk apparatus via the magnetic head; decoding means for restoring the read compressed video signal into an original video signal; display means for displaying the restored video signal; and sound recognition means for recognizing an audio signal. In the video signal recording and reproducing apparatus, predetermined video and audio signals are read out at a point of time when the sound recognition means recognizes a predetermined sound.

According to still another aspect of the present invention, a video signal recording and reproducing apparatus is provided. The video signal recording and reproducing apparatus includes: image compression means for digitizing an input continuous video signal and audio signal, thereby compressing an amount of information per unit time; writing means for intermittently writing a compressed video signal, obtained as an output of the image compression means, onto a hard disk apparatus via a magnetic head; reading means for intermittently reading out the written compressed video signal from the hard disk apparatus via the magnetic head; decoding means for restoring the read compressed video signal into an original video signal; and display means for displaying the restored video signal. In the video signal recording and reproducing apparatus, a video signal at an arbitrary point of time is retrieved for an arbitrary time period by an operation of a viewer from video signals which are being received or video signals which were previously recorded, and information for prohibiting overwriting data of the retrieved video signal is added to the retrieved video signal so as to be stored into the hard disk apparatus.

In one embodiment, when a video signal retrieved by an operation of a viewer is saved, search information required for the viewer to search for a desired video signal later is added to the video signal to be saved, and after the video signal which was previously retrieved and saved has been searched for and read out based on the search information, the read compressed video signal is decoded to be displayed on the display means.

In another embodiment, the video signal recording and reproducing apparatus includes at least an output terminal for outputting digital data which has been recorded onto the hard disk apparatus to the outside of the apparatus. In the video signal recording and reproducing apparatus, a video signal retrieved by a viewer is transferred to another recording apparatus through the output terminal.

According to still another aspect of the present invention, a video signal recording and reproducing apparatus is provided. The video signal recording and reproducing apparatus includes: image compression means for digitizing an input continuous video signal and audio signal, thereby compressing an amount of information per unit time; writing means for intermittently writing a compressed video signal, obtained as an output of the image compression means, onto a hard disk apparatus via a magnetic head; reading means for intermittently reading out the written compressed video signal from the hard disk apparatus via the magnetic head; decoding means for restoring the read compressed video signal into an original video signal; and display means for displaying the restored video signal. In the video signal recording and reproducing apparatus, while compressing a video signal which is being received and writing the compressed video signal onto the hard disk apparatus, a video signal which was previously recorded is read out and decoded into an original video signal, and after an amount of data of the decoded video signal has been reduced, the video signal is subjected to an image compression again and written onto the hard disk apparatus.

According to still another aspect of the present invention, a video signal recording and reproducing apparatus is provided. The video signal recording and reproducing apparatus includes: receiving means for simultaneously receiving television signals from a plurality of channels; image compression means for compressing an amount of information per unit time of the received continuous video signals from the plurality of channels; writing means for intermittently writing each compressed video signal, obtained as an output of the image compression means, onto a hard disk apparatus via a magnetic head; reading means for intermittently reading out the written compressed video signal from the hard disk apparatus via the magnetic head; decoding means for restoring the read compressed video signal into an original video signal; and display means for displaying the restored video signal. In the video signal recording and reproducing apparatus, while compressing video signals from the plurality of channels which are being received and writing the compressed video signals onto the hard disk apparatus, a video signal which was previously recorded from a particular channel is read out.

According to still another aspect of the present invention, a video signal recording and reproducing apparatus is provided. The video signal recording and reproducing apparatus includes: receiving means for simultaneously receiving television signals from a plurality of channels; synthesis means for synthesizing the received television signals from the plurality of channels into one screen; image compression means for compressing an amount of information per unit time of the continuous video signal which has been synthesized by the synthesis means; writing means for intermittently writing a compressed video signal, obtained as an output of the image compression means, onto a hard disk apparatus via a magnetic head; reading means for intermittently reading out the written compressed video signal from the hard disk apparatus via the magnetic head; decoding means for restoring the read compressed video signal into an original video signal; and display means for displaying the restored video signal. In the video signal recording and reproducing apparatus, a plurality of video signals are synthesized into one screen, subjected to an image compression and then written onto the hard disk apparatus.

By utilizing the above-described configurations, it is possible to provide an apparatus which can independently perform a trick play reproducing operation (e.g., a fast-forward reproducing operation or a backward reproducing operation) of a recorded part of a broadcast program which is now being received, while compression encoding and recording the broadcast program. As a result, it is possible to start watching a recorded part of a program without waiting for the program to end as is done in the recording and reproducing operations performed by a conventional single VTR. In addition, even when a viewer initially starts watching a program at a time much later than the broadcast start time of the program, the viewer can finish watching the program substantially at the same time as the broadcast end time by additionally utilizing a fast-forward reproducing function in the middle of the reproducing operation.

According to the present invention, it is possible to provide an apparatus which can perform a normal reproducing operation or a trick play reproducing operation (e.g., a fast-forward reproducing operation or a backward reproducing operation) of a recorded part of a broadcast program which is now being received, while recording the broadcast program by using a universal hard disk apparatus without using a plurality of VTRs or an expensive optical disk apparatus for which a recording head and a reproducing head are separately provided. As a result, it is possible to start watching a recorded part of a program without waiting for the program to end, as is necessary in the recording and reproducing operations performed by a conventional single VTR. In addition, even when a viewer initially starts watching a program at a time much later than the broadcast start time of the program, the viewer can finish watching the program substantially at the same time as the broadcast end time by additionally utilizing a fast-forward reproducing function in the middle of the reproducing operation, so that a considerable amount of time can be saved. Moreover, in the case where a viewer cannot help stopping watching a program in the middle of the program, even if the program still continues when the viewer resumes watching the program, the viewer can reproduce and watch the program from the scene which was broadcast when the viewer left, while continuing recording the program. Furthermore, in the case where a viewer watches a first program while recording a second program on a different channel, it is possible to instantaneously start watching the second program from the beginning thereof at a time after the first program ends and before the second program ends.

Thus, the invention described herein makes possible the advantage of providing a video signal recording and reproducing apparatus which can simultaneously record and reproduce a television signal.

This and other advantages of the present invention will become apparent to those skilled in the art upon reading and understanding the following detailed description with reference to the accompanying figures.

DESCRIPTION OF THE PREFERRED EMBODIMENTS

Hereinafter, the embodiments of the present invention will be described with reference to the accompanying drawings.

EXAMPLE 1

Figure 1:
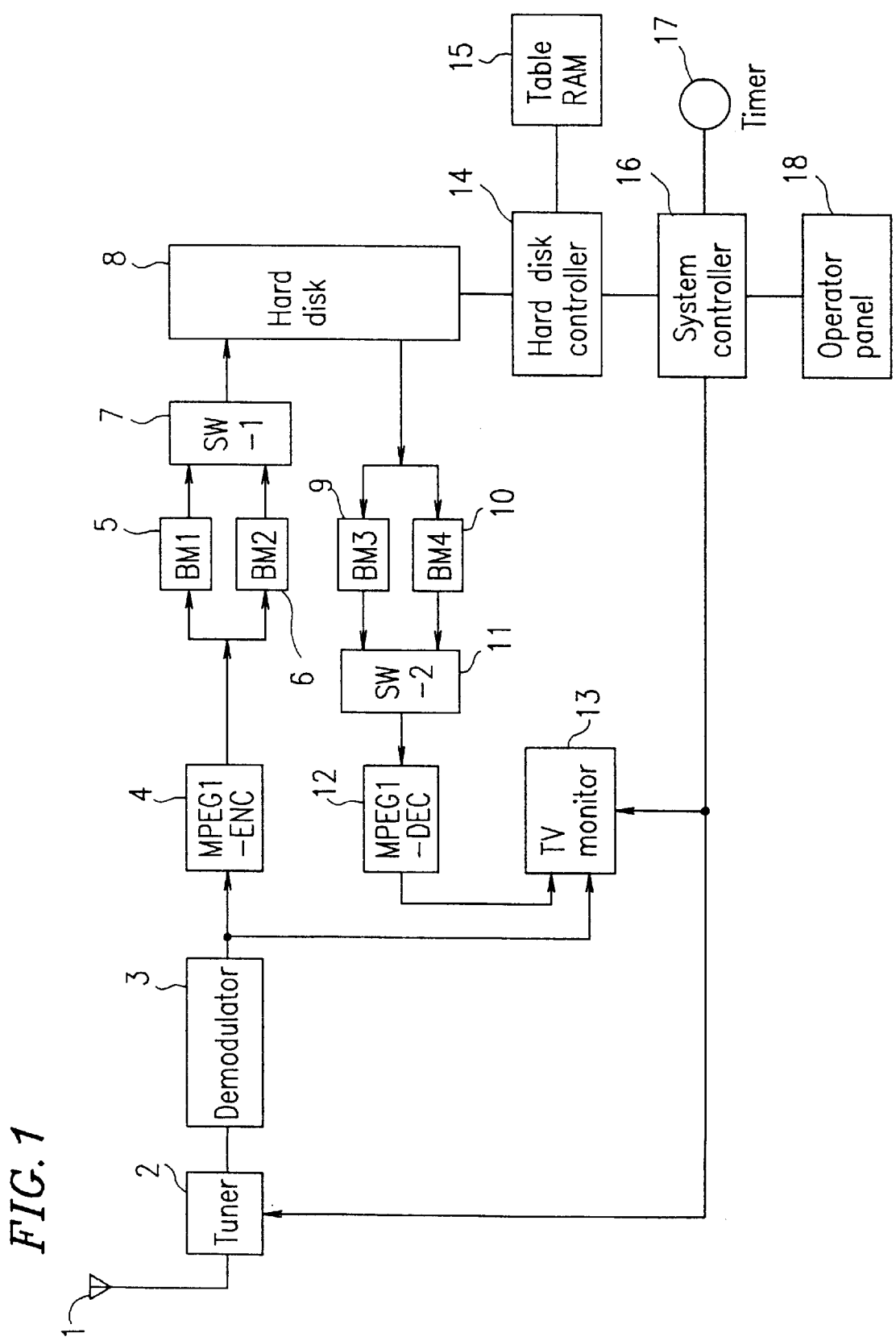
FIG. 1 is a block diagram illustrating a configuration for a video signal recording and reproducing apparatus in a first example of the present invention.

FIG. 1 is a block diagram illustrating a configuration for a video signal recording and reproducing apparatus in a first example of the present invention. In FIG. 1, the reference numeral 1 denotes an antenna; 2 denotes a tuner; 3 denotes a demodulator; 4 denotes an MPEG1 encoder; 5 and 6 denote recording buffer memories; 7 denotes a first switch; 8 denotes a hard disk apparatus; 9 and 10 denote reproducing buffer memories; 11 denotes a second switch; 12 denotes an MPEG1 decoder; 13 denotes a TV monitor; 14 denotes a hard disk controller; 15 denotes a table RAM; 16 denotes a system controller; 17 denotes a timer; and 18 denotes an operator panel.

First, before describing the operation of the apparatus in the first example with reference to FIG. 1, the operational concepts will be described with reference to FIG. 2. In this example, it is assumed that a viewer wants to watch a program which is to be broadcast from 10 p.m. to 12 p.m. (as shown in portion (*a*) of FIG. 2) but that it is only after 11 p.m. that the viewer can watch the program because of some inconvenience. In such a case, in accordance with the method of this example, while recording the program from 10 p.m. to 12 p.m. (as shown in portion (*b*) of FIG. 2), the viewer can start reproducing the program from the beginning thereof from 11 p.m. (as shown in portion (*c*) of FIG. 2). When a normal reproducing mode is selected, the reproducing operation ends at 1 a.m. which is two hours later than the time when the viewer started watching the program. On the other hand, since a fast-forward reproducing operation can also be performed on a part of the program which has already been recorded as shown in portion (*d*) of FIG. 2, it is also possible to reproduce all of the program at a time slightly later than 12 p.m., that is the time when the broadcasting of the program actually ends.

Hereinafter, a detailed operation of the video signal recording and reproducing apparatus of the first example will be described with reference to FIG. 1. First, a viewer pre-sets a TV channel, a recording start time and a recording end time of a program to be watched on the operator panel 18. For example, it is assumed that the viewer sets a program on channel # 6 starting at 10 p.m. In such a case, when it is 10 p.m., the system controller 16 sets the tuner 2 to channel # 6 in accordance with the information supplied from the timer 17 such that the electric waves for the channel # 6 are selected from the electric waves received by the antenna 1, and the demodulator 3 demodulates the received waves into signals.

The received signals can be monitored on the TV monitor 13. The received signals are converted by the MPEG1 encoder 4 into compressed video signals so as to be bit streams having a bit rate of 1.5 Mbps. These signals are transmitted via the first and the second recording buffer memories 5 and 6 having a capacity of 200 Kbytes, for example, and the first switch 7 so as to be written onto the hard disk apparatus 8.

This operation will be described in detail later with reference to FIG. 3. The sector information indicating the physical positions of the compressed video signals written on the hard disk and the time information of the written signals are stored in the table RAM 15 so as to correspond to each other. Such a state is maintained until 11 p.m., when the viewer starts watching the program. When it is 11 p.m., the viewer starts watching the program on the TV monitor 13. In this case, if the viewer wants to watch the program starting at 10 p.m. (i.e., reserved recording start time) from the beginning thereof, then the viewer has only to push the reproducing button (not shown) on the operator panel 18.

Figure 2:
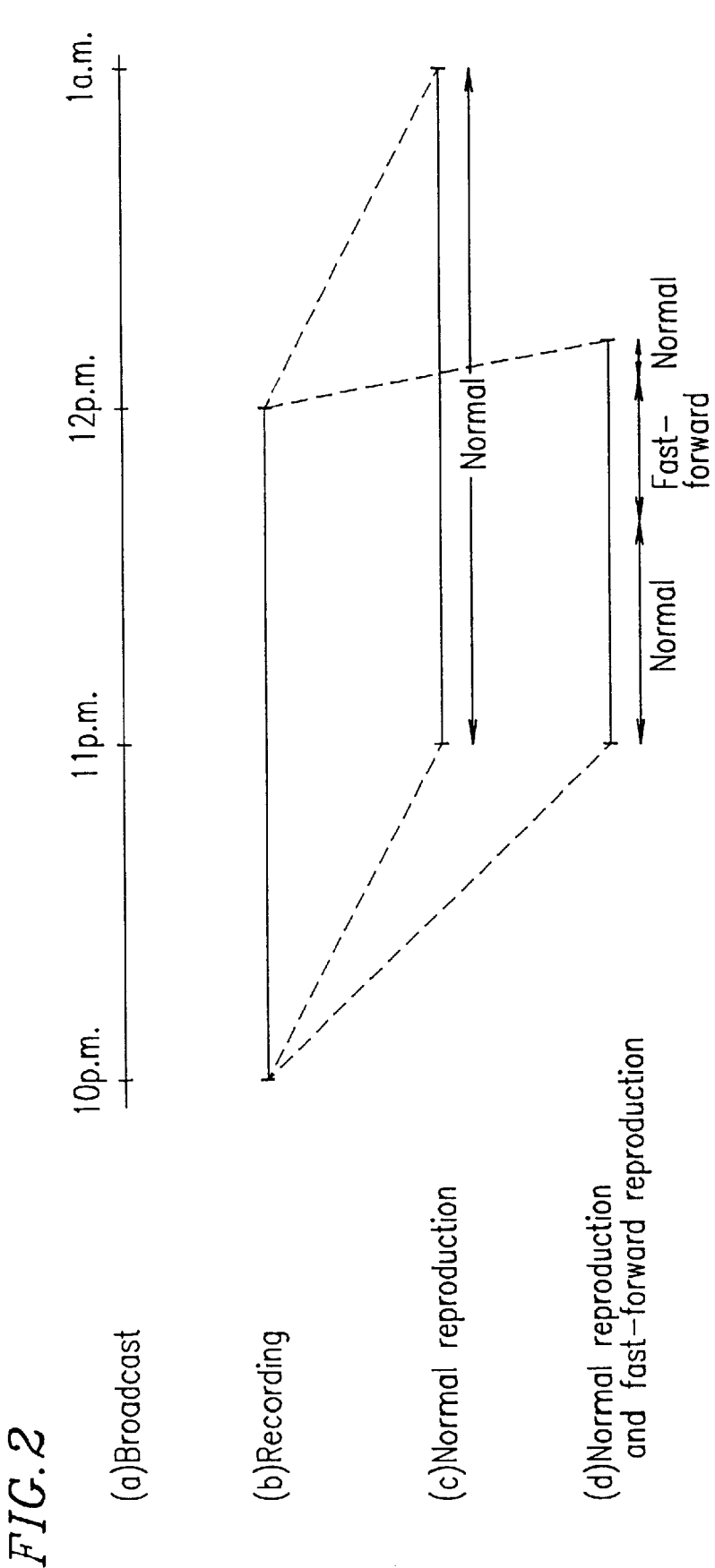
FIG. 2 is a diagram illustrating an operational concept in the first example.

In this case, the program starting at 10 p.m. is reproduced from the beginning thereof from 11 p.m. at a normal reproducing speed as shown in portion (c) of FIG. 2. The hard disk controller 14 controls the hard disk apparatus 8 in accordance with the information supplied from the table RAM 15, so that the compressed video signals recorded on the hard disk apparatus 8 are reproduced via the reproducing buffer memories 9 and 10 and the second switch 11. This operation will be described in detail later with reference to FIG. 3. The reproduced compressed video signals are decoded by the MPEG1 decoder 12 so as to be video signals which are displayed on the TV monitor 13.

It is noted that, in this example, the video signals compressed by the MPEG1 encoder 4 are being transmitted via the recording buffer memories 5 and 6 and the first switch 7 so as to be continuously written onto the hard disk apparatus 8 until 12 p.m. during the reproduction of the video signals. When it is 12 p.m., the system controller 16 finishes recording the compressed video signals onto the hard disk apparatus 8 in accordance with the information supplied from the timer 17. In this case, it is possible to monitor on the TV monitor 13, the video signals which are being written in parallel with the video signals which are being reproduced by using a technique such as a screen division.

On the other hand, in performing the reproducing operation, the viewer can reproduce a part of a program to be watched in detail at a slower speed and can reproduce an unnecessary part of the program at a higher speed in accordance with the instructions supplied from the system controller 16 by operating the operator panel 18. The correspondence between the sector information of the compressed video signals recorded on the hard disk, and the time information of the signals, has been stored in the table RAM 15 for performing these operations.

Figure 3:
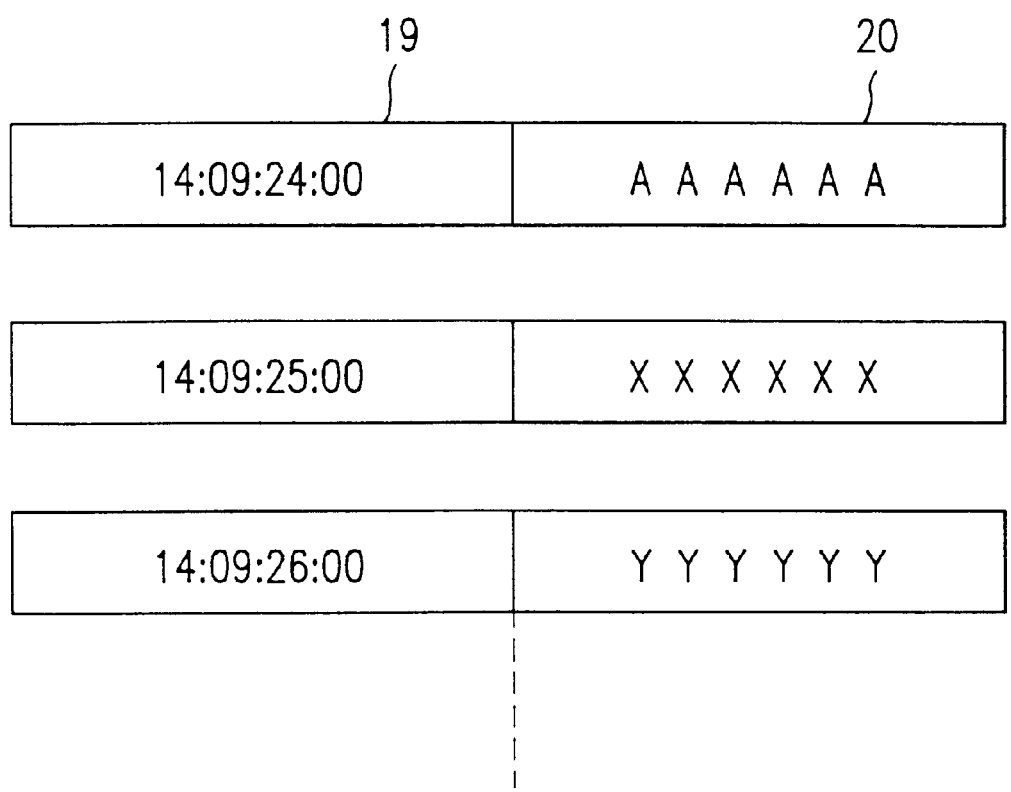
FIG. 3 is a diagram illustrating the contents of a table RAM.

The format of this table is shown in FIG. 3. In FIG. 3, the reference numeral 19 denotes the time information represented as a time code and 20 denotes a sector number on the hard disk. In this example, since each of a plurality of successive sectors corresponds to one second, sector addresses are indicated every other second in FIG. 3. In accordance with the operation of the viewer, the hard disk controller 14 reproduces required video signals based on this time information.

In the case of the MPEG1 standard, an image is generally compressed based on a unit consisting of a plurality of frames. A concept "GbP (group of pictures)" is used as the unit. For example, in the case where 1 GOP=15 frames, 1 GOP covers a video corresponding to 0.5 second. Thus, in the case of performing a fast forward reproducing operation or a slow reproducing operation, if a decimation or an interpolation is performed on a GOP basis with respect to a video which has been decoded on a GOP basis, the resulting motion of the image is no longer smooth. In order to make the motion smooth, the decimation or the interpolation is required to be performed on a frame basis.

That is to say, a 10× fast-forward reproducing operation (or a fast-forward reproducing operation performed at a speed ten times as high as a normal reproducing speed) is realized by reproducing one frame out of ten frames. On the other hand, a 1/10× slow reproducing operation is realized by displaying one and the same frame 10 times in succession.

A time difference between the time when the video which is now being reproduced was recorded (hereinafter, such a time will be referred to as a "video recording time") and the current time, can be calculated by subtracting the video recording time, obtained by using the time information supplied from the table RAM 15, from the current time. If the time difference is displayed on the TV monitor 13, the time difference can be monitored. Before this time difference becomes zero, any arbitrary part of the video which has already been recorded can be reproduced. In addition, it is also possible to simultaneously display on the TV monitor 13 both the time corresponding to the output of the demodulator 3 and the time corresponding to the output of the MPEG1 decoder 12 by dividing the screen into two parts. Then, a video which is now being broadcast (and corresponds to the output of the demodulator 3) and a video which is now being reproduced (and corresponds to the output of the MPEG1 decoder 12) can be simultaneously watched on the same screen.

Assuming that the hard disk apparatus has a capacity large enough to record compressed video signals corresponding to two hours, if the viewer does not start watching a program within two hours after the recording start time, the recorded signals are updated from the point of time two hours later than the recording start time, whereby a program corresponding to two hours preceding the time when the viewer starts watching the recorded program can always be covered. On the other hand, an update halt mode may also be selected. In such a case, a video can only be recorded for two hours in the same way as a commonly used VTR.

Hereinafter, detailed timings of peripheral hardware of the hard disk apparatus 8 will be described with reference to FIG. 4.

The detailed configuration of the hard disk apparatus 8 is omitted in FIG. 1. A hard disk apparatus which is universally used as a peripheral device for a computer system can be used as the hard disk apparatus 8. The hard disk apparatus 8 may include either one disk medium or a plurality of disk media and includes a recording and reproducing head, not a head exclusively used for a recording operation or a reproducing operation.

Figure 4:
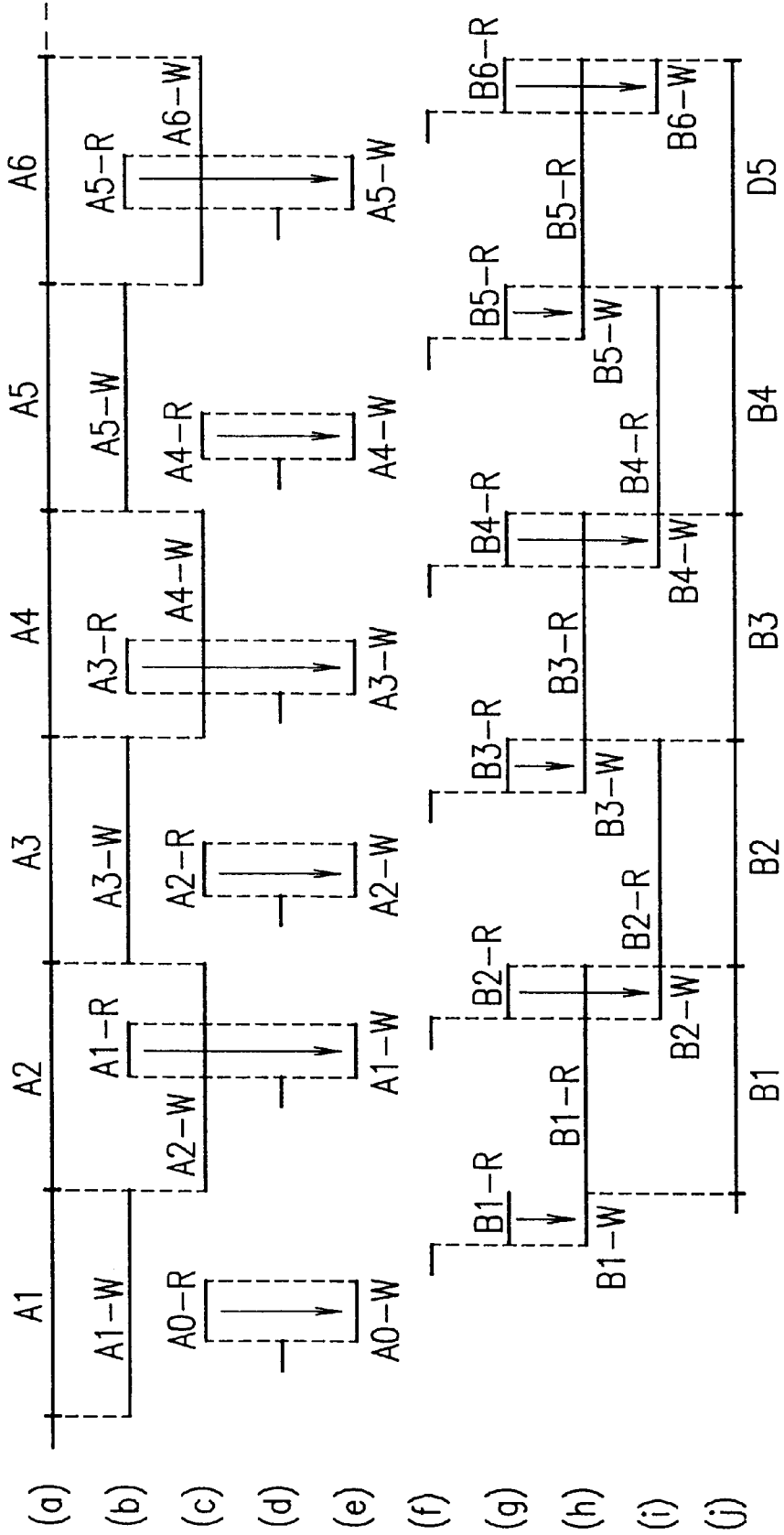
FIG. 4 is a detailed timing chart of peripheral hardware for a hard disk apparatus.

Portion (a) of FIG. 4 represents an output of the MPEG1 encoder 4 and A1, A2, A3, . . . A6 indicate the signals obtained by dividing the output by every 1.5 Mbits. Portion (b) of FIG. 4 represents the operational modes of the recording buffer memory 5 having a capacity of 200 Kbytes and W indicates writing a signal onto the memory and R indicates reading out a signal from the memory. Thus, A1-W means writing a signal A1 onto the buffer memory and A1-R means reading out the signal A1 from the buffer memory, for example. A signal is written onto the buffer memory in real time simultaneously with the video signals, while the signal is read out from the buffer memory at a high rate in accordance with the transfer rate at which the signal is transferred to the hard disk apparatus B.

Portion (c) of FIG. 4 represents the operational modes of the recording buffer memory 6 having a capacity of 200 Kbytes and W and R indicate the same operations as those in portion (b). The buffer memories 5 and 6 operate in pairs. More specifically, while one of the buffer memories 5 or 6 transfers data to the hard disk apparatus 8 via the first switch 7, the other buffer memory 6 or 5 stores therein a compressed video signal supplied from the MPEG1 encoder 4.

Portion (d) of FIG. 4 represents the seek timings for writing data onto the hard disk apparatus 8. Portion (e) of FIG. 4 represents the timings at which data is transferred from the buffer memories 5 and 6 to the hard disk apparatus 8 so as to be written thereon. A1-W means writing the signal A1 onto the hard disk apparatus 8. Though the time sequence is not specifically shown in FIG. 4, portions (b) and (c) always precede portion (e). For example, the signal A1 read out by A1-R in portion (b) is written by A1-W in portion (e).

Portion (f) of FIG. 4 represents the seek timings for reading out data from the hard disk apparatus 8. Portion (g) of FIG. 4 represents the timings at which data is read out from the hard disk apparatus 8 and B1-R means reading out a signal B1 from the hard disk apparatus 8, for example. Portion (h) of FIG. 4 represents the operational modes of the reproducing buffer memory 9 having a capacity of 200 Kbytes and B1-W means writing the signal B1 onto the buffer memory 9.

Portion (i) of FIG. 4 represents the operational modes of the reproducing buffer memory 10 having a capacity of 200 Kbytes and W and R indicate the same operations as those described above. The buffer memories 9 and 10 operate in pairs. More specifically, while a signal read out from the hard disk apparatus 8 is written onto one of the buffer memories 9 or 10, the other buffer memory 10 or 9 reads out a signal, which has been supplied from the hard disk apparatus 8 and stored in the buffer memory 10 or 9, at a rate of the video signal and then supplies the signal to the MPEG1 decoder 12 via the second switch 11.

Portion (j) of FIG. 4 represents an input to the MPEG1 decoder 12. As shown in FIG. 4, the input has been extended so as to have the same period as that of the output in portion (a) and is continuously reproduced.

As shown in FIG. 4, for recording and reproducing a video signal simultaneously and continuously, the period of each of the signals A1, A2, A3, . . . is set to be longer than the following time T:

T=(seek time for preparing to record data onto the hard disk)
+(time required for writing the data having the period onto the hard disk)
+(seek time for preparing to reproduce the data from the hard disk)
+(time required for reading out the data having the period from the hard disk)

If the total of these times becomes longer than the period of A1, A2, A3, . . . , then the video cannot be recorded but overflows. Thus, the period is required to be sufficiently longer than the total time. Since the seek time of the hard disk, in particular, largely varies depending upon situations, a maximum seek time is required to be estimated and included in the sum.

In this case, the period of A1, A2, A3, . . . is a time during which an MPEG bit stream having a bit rate of 1.5 Mbps is occupied by a buffer memory having a capacity of 200 Kbytes: 200 k÷(1.5 M 8)=about 1 second. Assuming that the data transfer rate of the hard disk is 1 Mbyte per second, the time required for transferring the data is: 200 k÷1 M=0.2 second. Even when the maximum seek time is estimated to be 100 milliseconds, T=0.1+0.2+0.1+0.2=0.6 second<1 second Thus, a sufficient margin time can be obtained.

As described above, the video signal recording and reproducing apparatus according to the present invention is a video signal recording and reproducing apparatus using a hard disk which can simultaneously perform the recording and reproducing operations in different portions of the same hard disk. Thus, it is possible to provide an apparatus which can perform a trick play reproducing operation (e.g., a fast-forward reproducing operation or a backward reproducing operation) of a recorded part of a broadcast program which is now being recorded, while recording the broadcast program.

As a result, it is possible to start watching the recorded part of a program without waiting for the program to end, as is necessary in the recording and reproducing operations performed by a conventional single VTR. In addition, even when a viewer initially starts watching a program at a time much later than the broadcast start time of the program, the viewer can finish watching the program substantially at the same time as the broadcast end time by additionally utilizing a fast-forward reproducing function in the middle of the reproducing operation, so that a considerable amount of time can be saved.

Furthermore, though audio signal recording and reproducing sections are not shown in FIG. 1, a sound accompanied with a video can be processed completely in the same way as the video. Therefore, the same description as applied to a "video" in this example is applicable to "video and sound".

It is noted that it is possible to perform the writing operation onto a hard disk only when it is necessary while a viewer watches a TV program for using the hard disk as long as possible. In such a case, a viewer starts a video recording operation by pushing an instruction button. A recording start button and a reproducing start button are provided for the operator panel 18 or a single button can be used for these two purposes. This function is effectively applicable to a case where a viewer cannot help stopping watching a TV program in the middle of the program for some unavoidable reason. For example, in the case where it becomes necessary to stop watching a TV program in the middle for receiving a visitor, responding to a telephone call, taking a bath or having a meal or the like, the viewer pushes the recording start button for recording the program from that point of time, settles his business and then pushes the reproducing start button. Thus, the recorded program is reproduced and the viewer can watch the program from the point of time when he started recording the program without missing any scene of the program. In addition, by providing an end setting button for allowing a viewer to set a recording end time easily, even if the viewer must go out suddenly and does not know exactly when he will be able to come home, the viewer can record a video for as long as he wants. Thus, the viewer can comfortably leave after he sets the hard disk in a writing state. In this case, if the end setting button is configured such that the recording time can be set depending upon how many times the viewer pushes the button (for example, one push of the button allows the program which is now being watched to be recorded for 30 minutes and two pushes of the button allows the program to be recorded for 1 hour), then the viewer can advantageously operate this apparatus very easily.

Since the program is continuously recorded during the reproduction of the program, the viewer can naturally watch the part of the program which is being broadcast during the reproduction.

In addition, a TV signal detector (not shown in FIG. 1) for determining whether or not a TV broadcast is available or not is incorporated in the de modulator 3 shown in FIG. 1. A synchronizing signal detector which is commonly provided for an existing TV receiver can be used as the TV signal detector and it is not necessary to additionally provide a novel circuit. Hereinafter, a case where a synchronizing signal detect or is used as the TV signal detector will be specifically described.

First, it is determined whether or not a synchronizing signal exists in the demodulated video signal. If a synchronizing signal is absent in the demodulated video signal, then it is determined to be out of a broadcasting time, thereby protecting the hard disk apparatus from the writing operation. If the writing operation has already been started on the hard disk apparatus, the writing operation onto the hard disk apparatus is temporarily suspended at a point of time when the synchronizing signal is no longer detected and is resumed when the synchronizing signal is detected again. As a result, it is possible to avoid performing a recording operation in an undesired time period (e.g., a midnight time or the like when no broadcast is available), so that the lifetime of the hard disk apparatus can be lengthened. This function will be effective for avoiding performing an unnecessary recording operation at midnight when no broadcast is televised, supposing that a hard disk comes to have a recording capacity large enough to always record a televised video corresponding 24 hours preceding the current time in the near future. Since a synchronizing signal detector is commonly available well known circuit, the detailed description thereof will be omitted herein. A synchronizing signal detector of the type which integrates a synchronizing signal obtained from a well known synchronizing signal separator thereby determining whether or not the DC level thereof is a normalized value, or a synchronizing signal detector of the type which determines whether or not the frequency of the synchronizing signal is a predetermined value (e.g., the frequency of a horizontal synchronizing signal is 15.73 KHz in an NTSC standard) is used herein.

This example has been described while using a synchronizing signal detector as a TV signal detector. However, in the case where a digital broadcast is received, the TV signal can be detected by a method in which it is determined whether or not an error signal detected by an error signal detector, used for reproducing a clock for a PLL or the like, is at a predetermined level or by a method in which it is determined whether or not the amount of the error flag output from an error detector for correcting an error of a transmitted signal is at a predetermined level.

If a viewer continuously records a program and supplies a signal by the push of a button or the like for stopping watching the program such that the recording stop time, the address and the like are stored; then the viewer can naturally reproduce the program from the point of time when the viewer stopped watching the program by pushing the reproducing start button for resuming watching the program.

In addition, by additionally providing a second tuner and a second demodulator (though not shown in FIG. 1), a channel to be watched and a channel to be recorded can be independently designated. For example, a case where a second program to be watched by a viewer starts on another channel while the viewer is watching a first program to be recorded will be assumed. In such a case, if the viewer starts to record the second program on the second channel, the viewer can watch the second program from the beginning thereof from the point of time when the first program which the viewer is watching ends.

EXAMPLE 2

Hereinafter, a second example of the present invention will be described. Since the fundamental configuration in the second example is substantially the same as that in the first example shown in FIG. 1, no drawings will be particularly referred to for describing the second example.

The video signal recording and reproducing apparatus of the second example is further provided with a circuit for inputting a video and/or a sound other than that of a broadcast (e.g., a reproduced signal of a VTR). If a part of a broadcast or desired video and/or sound input through the circuit is stored in the hard disk apparatus 8 for about 10 seconds and is automatically reproduced at a predetermined time every morning, the broadcast or the video and/or the sound can be used in place of an alarm clock so that a user can wake up comfortably.

It is noted that in such a case, the volume of the sound is required to be automatically adjusted to a sufficiently large volume, irrespective of a sound volume which was set the previous day. Furthermore, by additionally providing a speech recognition circuit for the apparatus shown in FIG. 1, the apparatus can reproduce a predetermined video by recognizing the audible alarm of an alarm clock other than the clock incorporated in the system. Alternatively, by recognizing not an alarm but a speech pattern such as "I'm home" when a user comes home, the apparatus can reproduce a predetermined video by reading the video from the hard disk apparatus 8.

Furthermore, it is true that a user is required to perform complicated operations for designating his desired video and/or sound. However, if compressed video and/or sound are/is recorded in an inexpensive medium such as a floppy disk or a CD-ROM and the medium is put on the market, then the user can record his desired video and/or the sound onto the hard disk by connecting a reader for reading the video and/or sound from the medium to this apparatus. If the user reproduces the video and/or the sound at a predetermined time every morning, the user can receive a morning call of his favorite actor or the like. Thus, this apparatus can also be used as an instrument for making a user's life comfortable.

EXAMPLE 3

Hereinafter, a third example of the present invention will be described. In this third example, the hard disk apparatus shown in FIG. 1 has at least two recording regions. The first recording region of the hard disk apparatus 8 is a recording region in which the video signal received by the tuner 2 is recorded for realizing the function described in the second example. The second recording region of the hard disk apparatus 8 is a recording region for saving therein the video data which has arbitrarily been retrieved by a viewer from the video data recorded in the first recording region. As a result, the viewer can selectively save arbitrary information from a televised program in the second recording region while the viewer is watching the program.

For example, if only a scene of a travel program frequently televised recently, in which the address, the telephone number and the like of a hotel are displayed on the screen or the contents of a dish, a service or the like are presented, is selectively saved in the second recording region, the viewer can save such information more exactly without any need for taking notes. In addition, if the viewer applies a file name to the video data retrieved by himself and then stored in a prescribed directory, the viewer will be able to search for his desired file later more easily.

A specific example will be described below. For example, the second recording region of the hard disk is divided beforehand into a plurality of directories for "restaurants", "travel spots", "hotels" and the like. The directory of "hotels" can be further divided into a plurality of subdirectories of "restaurant hotels", "hot-spring hotels" and the like. A viewer performs an operation for designating a start point and an end point of a video to be saved while the viewer is watching a program, and then selects a directory corresponding to the retrieved data. As a result, the video data is automatically saved in the selected directory. When the viewer searches for the video data later, the viewer will be able to find the video data by selecting his desired directory and the file name of the video data. If an external output terminal such as an SCSI interface is provided for the hard disk apparatus for storing the saved video data onto an external storage device such as a floppy disk drive or a PD drive, the viewer can produce his own database.

In this example, the hard disk apparatus is divided into two recording regions for simplifying the description. Alternatively, the same effects can also be attained by providing a circuit for designating whether the video data recorded on the hard disk is data which is to be automatically updated or data which is not updated unless the viewer commands the update. For example, the hard disk apparatus can be controlled by such a method that the type of recorded data, the sector information and the like are recorded in the table RAM 15 shown in FIG. 1 and the hard disk controller 14 determines whether or not the respective sectors can be updated based on the information.

EXAMPLE 4

Figure 5:
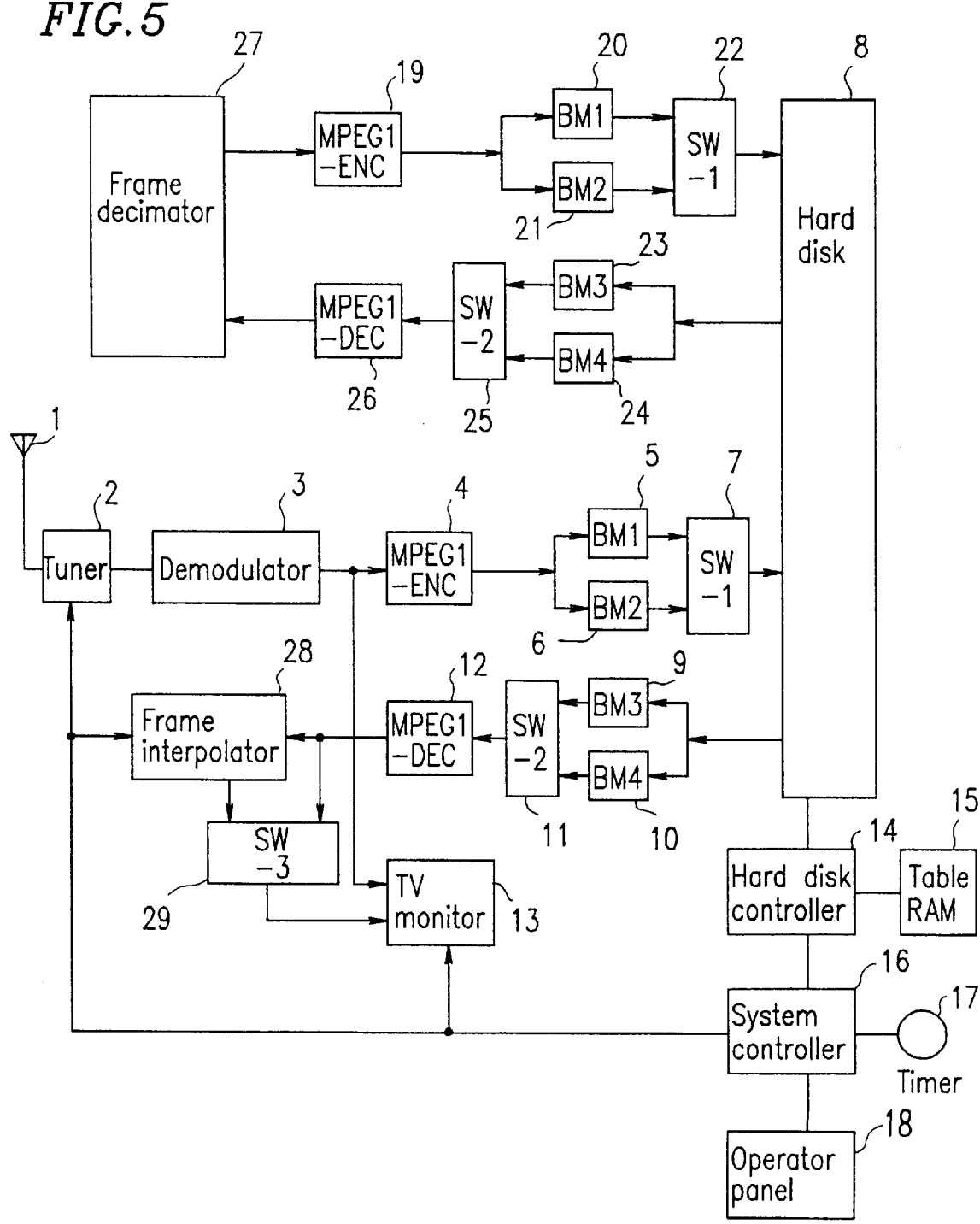
FIG. 5 is a block diagram illustrating a configuration for a video signal recording and reproducing apparatus in a fourth example of the present invention.

Hereinafter, the fourth example of the present invention will be described with reference to FIG. 5. In FIG. 5, since the reference numerals 1 to 18 denote the same components as those having the same reference numerals in the first example, the description thereof will be omitted herein. In addition, since the reference numerals 9 to 26 correspond to and have the same configurations as the reference numerals 4 to 7 and 9 to 12 in FIG. 5, respectively, the description thereof will also be omitted herein. In FIG. 5, the reference numeral 27 denotes a frame decimator; 28 denotes a frame interpolator; and 29 denotes a third switch.

The hard disk apparatus 8 has at least two recording regions. The first recording region is a region in which the video signal received by the tuner 2 is recorded and which realizes the function described in the first example. Assuming that the first recording region has a capacity large enough to record compressed video signals corresponding to two hours, if the viewer does not start watching a program within two hours after the recording start time, the video data which was recorded previously is updated from the point of time, whereby a video corresponding to two hours preceding the time when the viewer starts watching the recorded video can always be watched as a normal video as already described in the first example.

In this example, when the video data is updated, the previously recorded video data is once read out; passed through the buffer memories 23 and 24; and then decoded by the decoder 26 into the original video signals. Then, a frame decimator 27 performs frame decimation processing with respect to these decoded video signals, thereby reducing the amount of data. The output of the frame decimator 27 is compressed again by the encoder 19. The compressed video signal, a part of the frames of which have been decimated in this way, are saved in the second recording region. The resulting recordable time is varied depending upon the method for decimating the frames. For example, assuming that the compression is performed by extracting one frame out of four frames, a recordable time four times as long as the recordable time in the case of recording a normally compressed video signal can be secured by using the same recording capacity. That is to say, when a hard disk apparatus having a recording capacity large enough to record data corresponding to 2.5 hours by a normal recording operation is used, the viewer can watch a broadcast preceding the recording start time by about four hours (i.e., two hours in the first recording region and two hours in the second recording region) and check the contents of the broadcast. As a result, the viewer can confirm a larger amount of the contents of the programs while using a smaller recording capacity. In other words, while reducing the required minimum recording capacity of a hard disk apparatus, it is also possible to meet the viewer's demand for recording a video as long as possible.

It is natural that the audio signals recorded in the second recording region are normally recorded without performing a decimation operation on a frame basis. When the video signals recorded in the second recording region are read out to be displayed on the TV monitor 13, the output of the decoder 12 shown in FIG. 5 is once input to the frame interpolator 28, where the decimated frames are interpolated by the same frames and the interpolated signals are passed through the third switch 29 so as to be displayed on the TV monitor 13. In this example, a frame decimation method is used for reducing the amount of video data. Alternatively, various other methods such a sampling method and a color difference signal elimination method can also be used.

In this example, the hard disk apparatus is divided into two recording regions for simplifying the description. However, a circuit for applying information for identifying whether the video data recorded on the hard disk is data composed of normally recorded video signals, or data having a reduced amount of data by a frame decimation or the like to the video data recorded on the hard disk, and saving the data including the identifiers on the hard disk, may be provided. For example, it is possible to utilize a method in which the type of recorded data, the sector information and the like are recorded in the table RAM 15 shown in FIG. 5 and the hard disk controller 14 controls the hard disk apparatus 8 based on the information.

In addition, the viewer can independently set a time period during which a video signal is normally recorded and a time period during which data is recorded after the amount of the data is reduced by a frame decimation or the like. As a result, the viewer can utilize the apparatus of the invention so as to satisfy his own preferences more completely.

EXAMPLE 5

Hereinafter, the fifth example of the present invention will be described. Since the fundamental configuration used in this example is the same as that shown in FIG. 1, there are no drawings exclusively used for describing this example. If a plurality of (i.e., a number N of) tuners having the same configuration as the tuner 2 shown in FIG. 1 are provided, a plurality of video signals can be simultaneously received. A number N of encoders 4 may be provided. Alternatively, if an encoder of the type operating at an encoding rate N times as high as a normal encoding rate is used, then it is possible to use the encoder by switching it depending upon the time.

If a number N of hard disk apparatuses having the same configuration as that of the hard disk apparatus 8 shown in FIG. 1 are used in parallel; if the reading and writing rates from/onto the hard disk apparatus 8 are set to be higher while using a single hard disk apparatus 8 in the same way as in FIG. 1; or if the period A1, A2, A3, . . . or the capacity of the buffer memories is increased such that the time $T_N$ required for reading and writing in the N channels becomes shorter than the period, then it is possible to read out a video on a desired channel while simultaneously writing videos on the N channels. By realizing this function, a viewer can select his desired another TV channel after a TV program on a channel to be watched is finished without designating the another channel beforehand.

EXAMPLE 6

Figure 6:
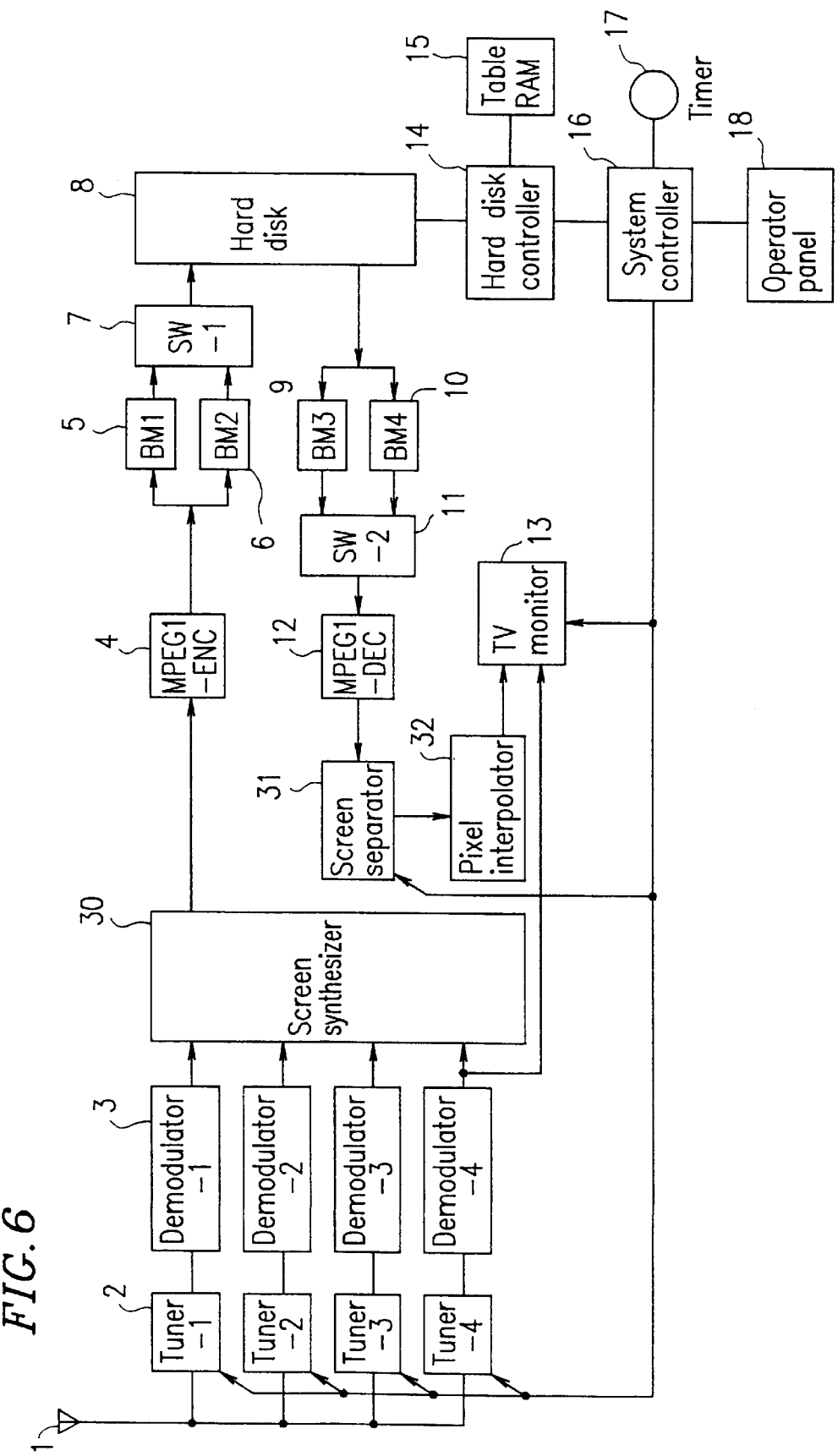
FIG. 6 is a block diagram illustrating a configuration for a video signal recording and reproducing apparatus in a sixth example of the present invention.

Hereinafter, the sixth example of the present invention will be described with reference to FIG. 6. In FIG. 6, since the reference numerals 1 to 18 denote the same components as those having the same reference numerals in the first example, the description thereof will be omitted herein.

Figure 7:
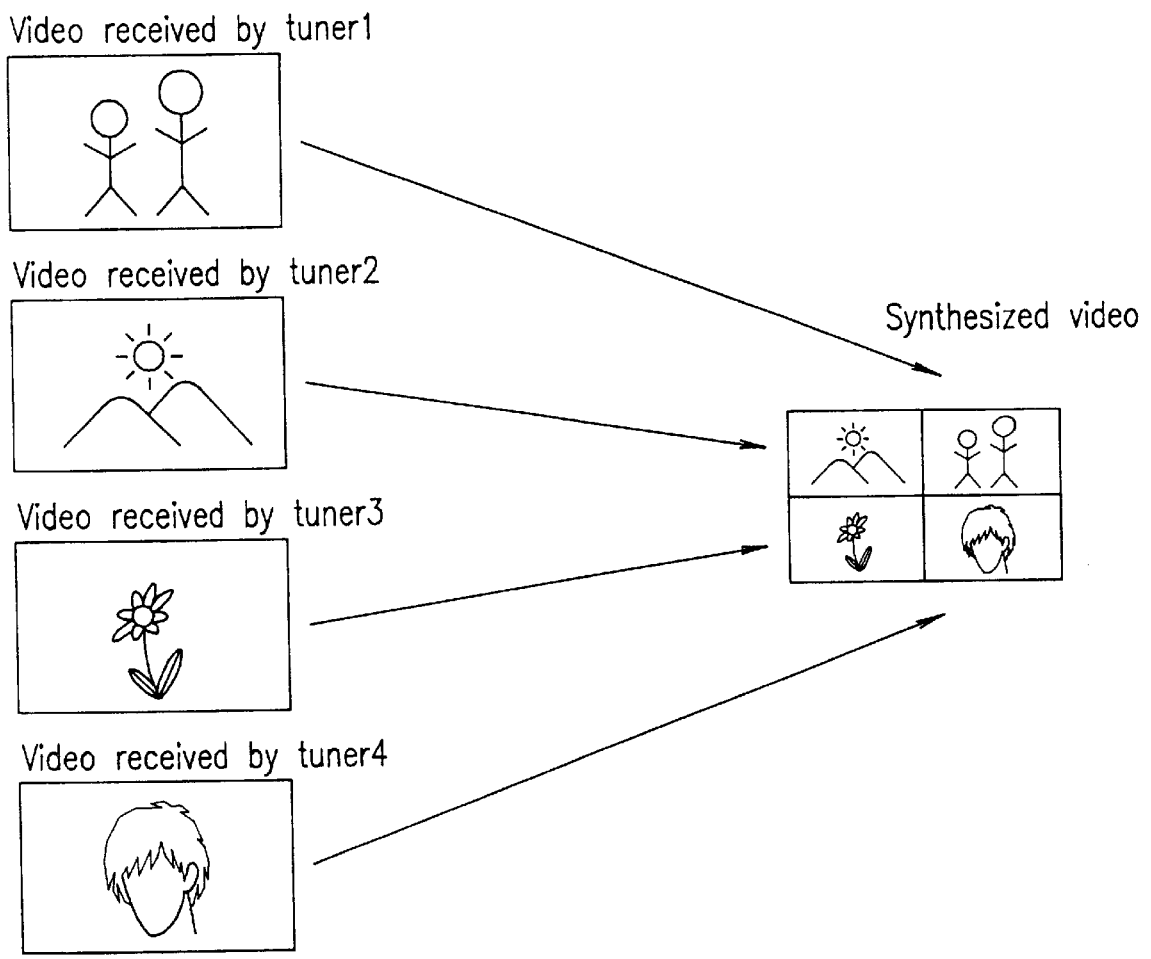
FIG. 7 is a diagram illustrating a screen synthesis in the sixth example of the present invention.
Figure 8:
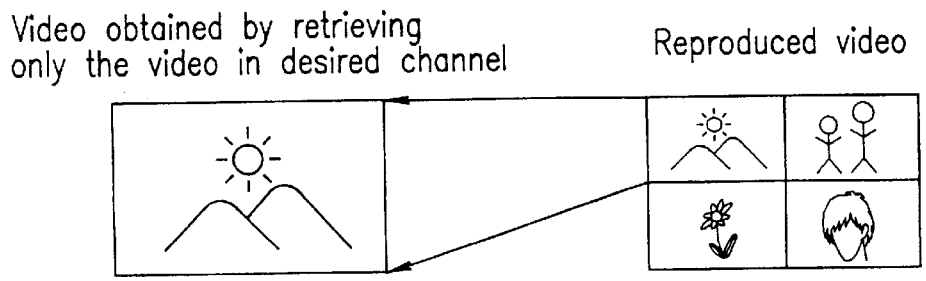
FIG. 8 is a diagram illustrating a screen separation in the sixth example of the present invention.

In FIG. 6, the reference numeral 30 denotes a screen synthesizer; 31 denotes a screen separator; and 32 denotes a pixel interpolator. In this example, by providing a plurality of (e.g., four in FIG. 6) tuners 2 and demodulators 3, a plurality of video signals can be simultaneously received. The received video signals are input to the screen synthesizer 30. The screen synthesizer 30 matches the phases of the synchronizing signals of the respective video signals by using frame memories (not shown) and then reduces the sizes of the screens corresponding to the respective video signals by performing a pixel decimation, a line decimation and the like, thereby synthesizing the screens having reduced sizes into one screen as shown in FIG. 7. A composite video signal obtained by synthesizing the video signals in the above-described manner is compressed by the encoder 4 and then recorded onto the hard disk apparatus 8 in the same way as in the first example. In performing a reproducing operation, the screen separator 31 extracts only the portion corresponding to the desired channel from the synthesized screen and the pixel interpolator 32 performs a pixel interpolation and a line interpolation on the extracted portion for enlarging the size of the portion to that of a normal screen and then displays the video on the TV monitor 13, as shown in FIG. 8. FIG. 8 is a diagram illustrating an operation of retrieving only the video in the desired channel from the reproduced video. As a result, videos on a larger number of TV channels can be recorded in the hard disk apparatus 8 having the same recording capacity as that of a conventional one. In addition, by reading out a video on a desired channel while simultaneously writing videos on the N channels, a viewer can select his desired another TV channel after a TV program on a channel to be watched is finished without designating the another channel beforehand. Furthermore, in this sixth example, it is not necessary to use an N-times-larger recording capacity for recording the videos in the N channels, unlike the third example, so that it is effectively possible to save the recording capacity of the hard disk apparatus.

It is naturally possible to directly display the composite video signal output from the decoder 12 without performing a screen separation.

In the foregoing examples, a recording format (or a relationship between a GOP unit and a sector unit on the hard disk, in particular) has not been specifically described. However, in view of the case of performing a trick-play reproducing operation such as a fast-forward reproducing operation, it is preferable to utilize a format in which a simple relationship is established between a GOP and a sector. For example, a format in which one GOP consists of a number K of sectors; a format in which one sector consists of a number M (where K and M are integers) of GOPs; a format in which a number K of sectors correspond to a number M of GOPs; or the like can be used.

In addition, if the hard disk apparatus of the present invention is configured as a hard disk apparatus having a removable drive portion which is currently used as a peripheral device for a personal computer, then the hard disk apparatus of the present invention can be advantageously used for forming a backup file of video data, saving particular video data and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for recording a video signal including a plurality of frames onto a hard disk apparatus and reproducing the video signal recorded onto the hard disk apparatus, comprising:

receiving means for receiving a video signal;

compression means for compressing an amount of information per a unit of M frames of the received video signal so as to output a compressed video signal;

time compression means for compressing an amount of time per a unit of N*M frames of the compressed video signal along a time axis so as to obtain a compressed video writing signal;

writing means for writing the compressed video writing signal onto a plurality of different portions of the hard disk apparatus via a magnetic head, each of the plurality of different portions having successive L sectors, N*M frames of the compressed video writing signal being written onto the successive L sectors;

reading means for reading an arbitrary compressed video writing signal, which was previously written onto the plurality of different portions of the hard disk apparatus, from the hard disk apparatus via the magnetic head to obtain a compressed video reading signal;

time decompression means for decompressing an amount of time per a unit of N*M frames of the compressed video reading signal along the time axis so as to obtain a decompressed video signal for reproduction;

decoding means for decompressing an amount of information per a unit of M frames of the decompressed video signal for reproduction; and control means for controlling the writing means and the reading means such that a period during which the compressed video writing signal is written onto the hard disk apparatus does not overlap with a period during which the compressed video reading signal is read from the hard disk apparatus, where L, M and N each is an integer greater than or equal to 1, wherein a period for the compressed video signal which is output from the compression means is set to be longer than time T.

where the time T is defined as a sum of seek time required for moving the magnetic head to write the compressed video writing signal onto the hard disk apparatus, time required for writing the compressed video writing signal onto the hard disk apparatus, seek time required for moving the magnetic head to read the compressed video reading signal from the hard disk apparatus, and time required for reading the compressed video reading signal from the hard disk apparatus.

2. An apparatus according to claim 1, wherein the receiving means further receives an audio signal.

3. An apparatus according to claim 1, wherein the M frames of the received video signal corresponds to one GOP.

4. An apparatus according to claim 1, wherein the compressed video writing signal which is written onto the hard disk apparatus at an earlier time is updated by a newly obtained compressed video writing signal.

5. An apparatus according to claim 1, further comprising instruction means for starting and/or finishing recording a video signal onto the hard disk apparatus.

6. An apparatus according to claim 1, wherein the instruction means for starting recording a video signal onto the hard disk apparatus is driven manually.

7. An apparatus according to claim 5, wherein the instruction means for starting recording a video signal onto the hard disk apparatus is driven by timer means.

8. An apparatus according to claim 5, wherein the instruction means for finishing recording a video signal onto the hard disk apparatus is driven by timer means.

9. An apparatus according to claim 1, further comprising instruction means for starting and/or finishing reproducing the recorded video signal from the hard disk apparatus.

10. An apparatus according to claim 1, wherein the instruction means for starting reproducing the recorded video signal from the hard disk apparatus is driven manually.

11. An apparatus according to claim 1, further comprising display means for displaying the decompressed video signal.

12. An apparatus according to claim 11, wherein the display means further displays a time difference between a time at which a video signal which is being reproduced was recorded and a current time.

13. An apparatus according to claim 11, wherein the display means further displays a time at which a video signal which is being reproduced was recorded and a current time.

14. An apparatus according to claim 11, wherein the display means further displays the received video signal and an output of the decoding means, simultaneously.

15. An apparatus according to claim 3, further comprising operation means for selectively setting one of a normal reproduction mode, a fast forward reproduction mode, a backward reproduction mode and a slow reproduction mode as a reproduction mode.

16. An apparatus according to claim 15, further comprising frame decimation means for decimating a frame from decoded video signal decoded from GOP signal which is reproduced from the hard disk apparatus when the operation means sets one of the fast forward reproduction mode and the backward reproduction mode.

17. An apparatus according to claim 15, further comprising frame interpolation means for interpolating a frame from decoded video signal decoded from GOP signal which is reproduced from the hard disk apparatus when the operation means sets the slow reproduction mode.

18. An apparatus according to claim 1, further comprising television signal detection means for detecting a normal television signal as the video signal received by the receiving means, wherein the writing of the compressed video writing signal onto the hard disk apparatus is enabled only when the television signal detection means has detected the normal television signal.

19. An apparatus according to claim 1, further comprising speech recognition means for recognizing a speech, wherein the control means controls the reading means such that a predetermined compressed video reading signal is read from the hard disk apparatus in response to the recognition of the speech.

20. An apparatus according to claim 1, wherein the control means controls the writing means such that a part of the compressed video writing signal is selected and written onto the hard disk apparatus with information for prohibiting overwriting data onto the hard disk apparatus in response to an input from a user.

21. An apparatus according to claim 20, wherein the selected part of the compressed video writing signal is accompanied with information which is used to search the selected part of the compressed video writing signal during reproduction.

22. An apparatus according to claim 20, wherein the control means further controls transfer of the selected part of the compressed video writing signal to another apparatus.

23. An apparatus according to claim 1, further comprising a decimating means for decimating a part of the reproduced video signal, wherein the compression means compresses the amount of information per a unit of M frames of the decimated reproduced video signal.

24. An apparatus according to claim 1, wherein the receiving means receives a plurality of video signals from a plurality of channels, the compression means compresses the amount of information per a unit of M frames of each of the received plurality of video signals from the plurality of channels so as to output the compressed video signal.

25. An apparatus according to claim 1, wherein the receiving means receives a plurality of video signals from a plurality of channels, the apparatus further comprises a synthesis means for synthesizing the plurality of video signals received from the plurality of channels into a synthesized signal, the compression means compresses the amount of information per a unit of M frames of the synthesized signal.

26. An apparatus according to claim 1, wherein the receiving means receives a plurality of video signals from a plurality of channels.

* * * * *

UNITED STATES PATENT AND TRADEMARK OFFICE
CERTIFICATE OF CORRECTION

PATENT NO. : 6,226,447 B1
DATED : May 1, 2001
INVENTOR(S) : Seishi Sasaki et al.

It is certified that error appears in the above-identified patent and that said Letters Patent is hereby corrected as shown below:

Column 16,
Line 47, replace "T." with -- T, --.

Column 17,
Line 1, replace "1" with -- 5 --.
Line 13, replace "1" with -- 9 --.

Signed and Sealed this

Eighteenth Day of June, 2002

*Attest:*

*Attesting Officer*

JAMES E. ROGAN
*Director of the United States Patent and Trademark Office*